Jan. 9, 1940.  L. R. MARTIN  2,186,611
PHOTOGRAPHIC APPARATUS
Filed July 14, 1938
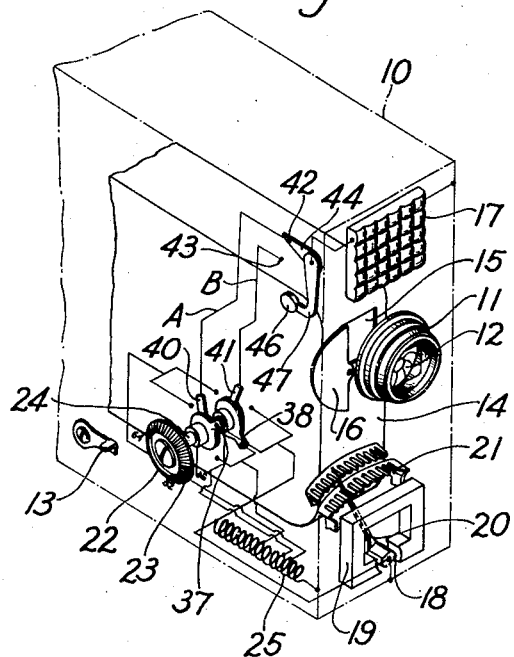
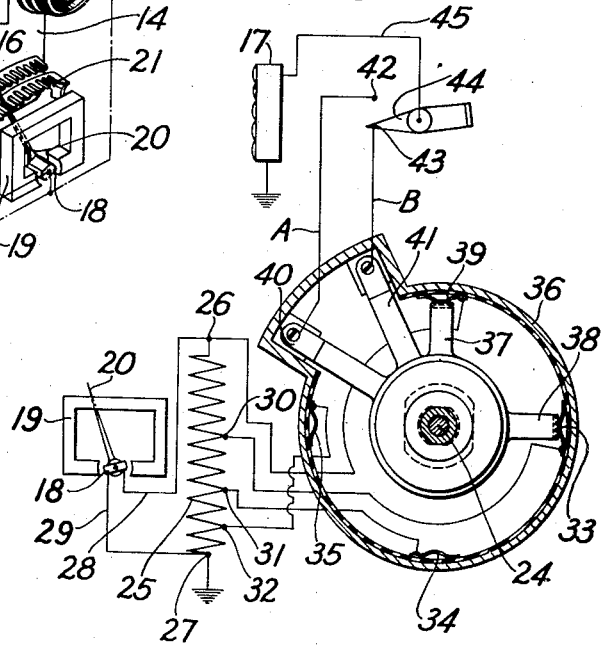
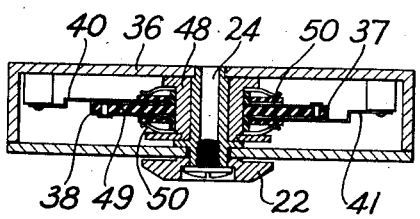
Lawrence R. Martin
INVENTOR
BY
ATTORNEYS Patented Jan. 9, 1940

2,186,611

UNITED STATES PATENT OFFICE 2,186,611

PHOTOGRAPHIC APPARATUS

Lawrence R. Martin, Rochester, N. Y., assignor to Eastman Kodak Company, Rochester, N. Y., a corporation of New Jersey Application July 14, 1938, Serial No. 219,179

3 Claims. (Cl. 95—64)

My present invention relates to photographic apparatus and, more particularly, to photographic cameras provided with photoelectric apparatus for regulating the exposure setting of the camera.

More specifically my invention relates to cameras in which a cell controlled meter for determining the exposure is adapted to have its operating characteristics or calibration adjusted in accordance with one or more of the factors affecting an exposure such as, for example, the diaphragm opening, the shutter interval and the sensitivity of the photographic material employed.

It is an object of the invention to provide an arrangement for adjusting or altering the calibration of such a photoelectric device in a simple and accurate manner.

Another object of the invention is to provide in a magazine camera an arrangement whereby insertion of a magazine will adjust the calibration of the photoelectric device in accordance with the speed of the film carried by the magazine.

A further object of the invention is to provide a circuit arrangement whereby adjustment of the camera diaphragm or shutter speed setting simultaneously controls the resistance in two or more circuits, one of which is selected in accordance with the sensitivity of the film being used.

Other objects and advantages of the invention will become apparent from the following description when read in connection with the accompanying drawing in which:

Fig. 1 is a perspective view partly in outline of the front portion of a motion picture camera to which one embodiment of my invention is applied;

Fig. 2 is a circuit diagram including a special switch; and,

Fig. 3 is a cross section showing the structure of the switch shown in Fig. 2.

In the interest of clarity, I have shown in the drawing only those parts of a camera apparatus necessary to illustrate the manner in which my invention may be applied thereto.

For the purpose of illustration I have chosen to show my invention as applied to a photoelectric device employed for controlling the diaphragm opening of a camera. It will be understood, however, that it is applicable also to such devices when employed for other purposes such as controlling the shutter setting or indicating proper exposure settings.

One embodiment of the invention is shown in Fig. 1 as applied to a motion picture camera having a casing 10 shown in outline which carries the usual objective mount 11 provided with a diaphragm 12 and a release lever 13. The camera 10 is adapted to receive a film magazine 14 provided with an exposure window 15 and the light falling on the window 15 is suitably interrupted by a shutter 16 in any well known manner. The camera 10 is provided with a diaphragm adjusting mechanism of the type disclosed in Patent 2,058,483, to Mihalyi, and includes a light sensitive cell 17 which is connected to a coil 18 which forms with a magnet 19 a suitable meter element.

The coil 18 of the meter is provided with a pointer 20 which functions as described in the above Mihalyi patent to control the adjustment of the diaphragm. For the purpose of the present invention it is sufficient to state that the response of the cell 17 causes the pointer 20 to assume a position which is a function of the light received by the cell 17 after which movement of the camera release lever 13 initially moves a toothed member 21 to entrap the pointer 20 in its deflected position and then adjusts the diaphragm 12 to a setting determined by the position of the pointer. Final movement of the lever 13 releases the camera mechanism (not shown) to make a series of exposures in any well known manner.

The camera 10 is provided with any suitable mechanism for adjusting the speed at which the shutter 16 will be operated. For the purpose of illustration I have shown a control knob 22 provided with an index mark 23 for indicating the speed setting of the mechanism. As shown, the camera is adapted for three shutter speeds 16, 32 and 64 exposures per second, respectively. This knob 22 is preferably mounted on a suitable shaft 24 which, in addition to the speed controlling member (not shown), is provided with circuit controlling means which function to recalibrate or adjust the characteristics of the photoelectric device including the cell 17 and the meter coil 18 in a manner now to be described.

For adjusting the characteristics of the photoelectric device, the ratio between the current supplied to the meter coil 18 and the activation of the cell 17 is altered in accordance with the speed setting of the camera and also in accordance with the sensitivity of the film to be exposed or any other factor affecting the exposure which it is desired to take into account.

As shown in Figs. 1 and 2, this ratio is adjusted by means of the inclusion in the cell meter circuit of different magnitudes of resistances in shunt with the meter coil 18. This resistance may be in series or a combination of series and shunt, but I prefer to employ only a shunt resistance since it has been found to be more suitable for the minute currents involved.

As shown, this shunt resistance comprises a resistance 25, having its two end terminals 26 and 27 connected across input leads 28 and 29 to the meter coil 18. This resistance 25 is provided with taps 30, 31 and 32 which are connected respectively to electrodes 33, 34 and 35 of a rotary switch 36 having radial contact arms 37 and 38 which are carried by and angularly spaced on the shaft 24 of the speed control knob 22. The switch 36 has a fourth electrode 39 which is directly connected to the terminal 26 of the resistance 25. These four electrodes 33, 34, 35 and 39 have the same angular separation as the contact arms 37 and 38 so that, upon rotation of the arms 37 and 38, they will simultaneously contact two adjacent electrodes. The contact arms 37 and 38 are electrically insulated and separately connected to terminals 40 and 41, respectively, and these terminals are connected by leads A and B to contacts 42 and 43, respectively, positioned to be engaged selectively by a switch arm 44 connected by lead 45 to the cell 17.

With the arrangement above described, it will be seen that adjustment of the speed control knob 22 rotates the switch shaft 24 to adjust simultaneously the amount of the resistance 25 included in the circuits A and B and that, by means of the switch 44, either of these circuits may be selected thereby determining which resistance value will be employed for modifying the input coil to the meter coil 18.

The selecting of circuit A or B by means of the switch 44 may be made in accordance with any desired factor influencing the exposure and, as shown in Fig. 1, has been selected in accordance with the sensitivity of the film to be exposed. In this particular arrangement, this selection by the switch 44 is made automatically by providing the magazine 14 with an embossing 46 which is positioned to engage an operating arm 47 provided for the switch 44 and is so located that upon insertion of the magazine 14 in the camera the embossing 46 will, depending upon its location, determine which of the circuits A and B is selected or completed by the switch 44. The switch 44 and its operating arm 47 are preferably biased in any suitable manner toward the position shown in Fig. 1 and from which position they may be moved against the biasing force to the position at which the circuit B is completed.

The operation of the arrangement above described is quite simple in that the adjustment of the speed control knob 22 sets up two circuits A and B which have the proper characteristics for securing the correct diaphragm adjustment for two different film speeds and the embossing 46 by actuating the switch 44 selects one of the circuits A and B in accordance with the speed of the film, whereby, upon actuation of the camera by means of the release 13, the pointer 20 will have assumed a position depending upon the activation of the cell 17 as modified by the portion of the resistance 25 included in shunt across the meter coil 18. The magnitude of this resistance is, of course, determined by the setting of the switch 36 and the switch 44.

The circuit arrangement for calibrating a photoelectric device in accordance with my invention is, of course, applicable to other embodiments, since its functioning does not depend in any way upon the use or purpose of the meter pointer 20, and since its primary purpose is to secure the proper deflection of this pointer 20.

Although anyone skilled in the art could readily construct a switch for performing the switching operations required of the switch 36, one particular form quite suitable for the embodiment of the invention illustrated is shown in Figs. 2 and 3 as comprising an outer casing 36 in which is mounted the shaft 24 of the speed control knob 22. This shaft 24 has secured thereto a bushing 48 upon which is securely mounted a disc 49 of insulating material to which are secured the contact arms 37 and 38 so that they are rotated upon rotation of the shaft 24. The strip of metal forming the contact arm 37 is conductively connected to the terminal strip 40 and the arm 38 is similarly connected to the terminal arm 41. These two arms 40 and 41 are stationary and good conducting engagement between them and their respective contact arms may be insured by the provision of a suitable means such as spring members 50 surrounding the shaft and pressing the several switch members together.

While I have illustrated and described a single embodiment of the invention in order to illustrate the manner in which a photoelectric device may have its operating characteristics altered, it is to be understood that the invention may be applied to many other embodiments and that more than two circuits may be made available upon the adjustment of one factor, one of which circuits is to be selected in accordance with another factor entering into proper exposure.

What I claim is new and desire to secure by Letters Patent of the United States is:

1. A photographic camera including two adjustable exposure controlling devices, a photoelectric mechanism for controlling the adjustment of one of said devices, a plurality of different circuits for said mechanism, means for adjusting the resistance of all of the circuits in accordance with the adjustment of the other of said devices, and means for selectively completing one of said circuits in accordance with the sensitivity of the photographic material to be exposed in the camera.

2. A photographic camera including two adjustable exposure controlling devices, a photoelectric mechanism for controlling the adjustment of one of said devices and including a light sensitive cell and an electric meter, at least two circuits available for connecting said cell to said meter, means movable to alter simultaneously the resistance in each available circuit, means for moving said means when the other of the exposure controlling devices is adjusted, and switching means for selectively connecting said cell and meter through one of the available circuits in accordance with some other factor affecting the exposure.

3. In a photographic camera having a cell controlled meter for determining the exposure setting of the camera, a plurality of circuits available for connecting the meter to the cell, a resistance shunting the meter and common to all of the circuits, means for adjusting simultaneously the amount of said resistance included in each circuit while maintaining a predetermined relation between the amounts of resistance in the different circuits, and means for selectively completing one of the available circuits in accordance with some factor affecting the exposure.

LAWRENCE R. MARTIN.